United States Patent
Frost

(10) Patent No.: US 10,865,046 B2
(45) Date of Patent: Dec. 15, 2020

(54) CONVEYOR CHAIN WITH ADJUSTABLE LINK PINS

(71) Applicant: Frost Tech LLC, Grand Rapids, MI (US)

(72) Inventor: Charles C. Frost, Ada, MI (US)

(73) Assignee: Frost Tech LLC, Grand Rapids, MI (US)

( * ) Notice: Subject to any disclaimer, the term of this patent is extended or adjusted under 35 U.S.C. 154(b) by 0 days.

(21) Appl. No.: 16/318,122

(22) PCT Filed: Jul. 18, 2017

(86) PCT No.: PCT/US2017/042507
§ 371 (c)(1),
(2) Date: Jan. 15, 2019

(87) PCT Pub. No.: WO2018/017527
PCT Pub. Date: Jan. 25, 2018

(65) Prior Publication Data
US 2019/0233215 A1    Aug. 1, 2019

Related U.S. Application Data

(60) Provisional application No. 62/363,647, filed on Jul. 18, 2016.

(51) Int. Cl.
*B65G 17/38*    (2006.01)
*B65G 17/40*    (2006.01)
*F16G 13/08*    (2006.01)

(52) U.S. Cl.
CPC ............. *B65G 17/38* (2013.01); *F16G 13/08* (2013.01)

(58) Field of Classification Search
None
See application file for complete search history.

(56) References Cited

U.S. PATENT DOCUMENTS

| | | | | |
|---|---|---|---|---|
| 2,600,174 A | * | 6/1952 | Sheehan | B65G 17/385 198/852 |
| 2,951,578 A | * | 9/1960 | Hibbard | B65G 17/02 198/845 |
| 4,640,406 A | | 2/1987 | Willison | |
| 5,234,100 A | * | 8/1993 | Cook | B65G 39/09 198/842 |
| 5,257,690 A | * | 11/1993 | Dehne | B65G 17/38 198/500 |
| 5,563,392 A | * | 10/1996 | Brown | B65G 43/02 235/91 R |
| 6,854,591 B1 | | 2/2005 | Lomerson, Jr. et al. | |
| 7,246,699 B2 | | 7/2007 | Frost et al. | |
| 2003/0168323 A1 | | 9/2003 | Frost | |

(Continued)

*Primary Examiner* — Kavel Singh
(74) *Attorney, Agent, or Firm* — Mitchell Intellectual Property Law, PLLC

(57) ABSTRACT

A conveyor chain having links joined by link pin biased into any of multiple operating positions with its positioning head blocked against rotation by engagement with a detent on a positioning link. The pin can be lifted so that its head is above the level of the detent, rotated to a new operating position, and allowed to be biased back into its position with the head again blocked against rotation by the detent, whereby the wear surface of the pin can be changed to accommodate for chain wear occurring when a link rotates relative to the link pin.

17 Claims, 6 Drawing Sheets

(56) References Cited

U.S. PATENT DOCUMENTS

| | | |
|---|---|---|
| 2005/0061636 A1 | 3/2005 | Frost et al. |
| 2007/0184698 A1 | 8/2007 | Rathbun et al. |
| 2008/0047804 A1 | 2/2008 | Rathbun et al. |
| 2016/0010977 A1 | 1/2016 | Frost et al. |

* cited by examiner

CONVEYOR CHAIN WITH ADJUSTABLE LINK PINS

CLAIM OF PRIORITY

This application claims priority to U.S. Provisional Application Ser. No. 62/363,647 filed Jul. 18, 2016, and entitled CONVEYOR CHAIN WITH ADJUSTABLE LINK PINS.

FIELD AND BACKGROUND OF THE INVENTION

The present invention relates to conveyor chains having links joined by link pins. The link pins in such a chain have a wear surface which is worn by the relative movement between the pin and an associated link. In U.S. Pat. No. 7,246,699, we disclose such a conveyor chain having link pins which are adjustable to at least three different positions, such that the wear surface between the pin and the movable link can be adjusted to extend the link pin life. Following a period of use, the conveyor line is shut down, and the adjustable pins are partially removed, rotated to a new wear surface, and then reseated in position between adjoining links. Partial removal requires relief of chain tension on the link pin, and turning the side links sideways to the center link, and then moving the side links towards the narrower center of the center link. The link pin can then be manually lifted out of engagement with a positioning well on one of the side links, and manually rotated to expose a new wear surface. The link pin is then reseated in the positioning well, and the chain is re-tensioned to engage the new wear surface with the center link.

SUMMARY OF THE INVENTION

In the present invention, each link pin is biased into its operating position with its positioning head blocked against rotation by engagement with a detent which is a feature of the link in which the pin is located. The pin can be lifted so that its head is above the level of the detent, rotated to a new operating position, and allowed to be biased back into its position with the head blocked against rotation by the detent.

In one embodiment, the opposite end of the pin includes a tool engaging head. When it is necessary to adjust the pin to a new wear position, the tool engaging head is engaged by a turning tool, and the tool is forced against the biasing member to compress it, thereby lifting the positioning head of the pin out of its locked engagement with the link detent. The pin is then rotated to a new wear surface; the tool is removed and the biasing member biases the positioning head of the pin back into engagement with the detent of its associated link.

In another embodiment, the detent is defined by a separate ramp for each operating position of the pin. When the pin is rotated, the pin head rides up and over the ramps until it settles into a depression defined by the elevated end of one ramp and the beginning end of the next ramp. Preferably, the pin head includes projections, at least one of which extends into the path of a retractable turning tool, past which the chain moves. When the turning tool is activated into position in the path of the projection, it engages the projection and turns the pin as the pin head passes, thus rotating the pin to a new operating position. The turning tool then slides past the projection it had engaged, and a new projection has been rotated into the path of the turning tool the next time a change in position is required, and the turning tool is again activated to its location adjacent the passing chain.

These and other features and advantages of the invention will be more fully understood and appreciated by reference to the Description of the Preferred Embodiments, and the appended drawings.

DESCRIPTION OF THE PREFERRED EMBODIMENTS

In the description of the preferred embodiments, the various components are identified as follows:

| | |
|---|---|
| Conveyor chain segment | 1 |
| Position control chain side link | 10 |
|     Pin head retaining well detent | 11 |
|     Pin aperture | 12 |
|     Pin head retaining rib detent | 13 |
|     Pin insertion opening | 14 |
|     Ramped retaining well detent | 15 |
|         Ramps | 15a |
| Chain center link | 20 |
|     Pin receiving end portion | 21 |
| Neutral side link | 30 |
|     Pin apertures | 31 |
| Link pin | 40 |
|     Positioning head | 41 |
|     "Turn-style" projections | 41a |
|     Shaft | 42 |
|         Threaded end | 42a |

| | |
|---|---|
| Tool engaging head | 43 |
| Nut | 43a |
| I-pin head | 43b |
| Biasing member | 50 |
| Bellville washers | 51 |
| Coil spring | 52 |
| Turning tool | 60 |
| Turning tool (stop) | 70 |

Figure 1:
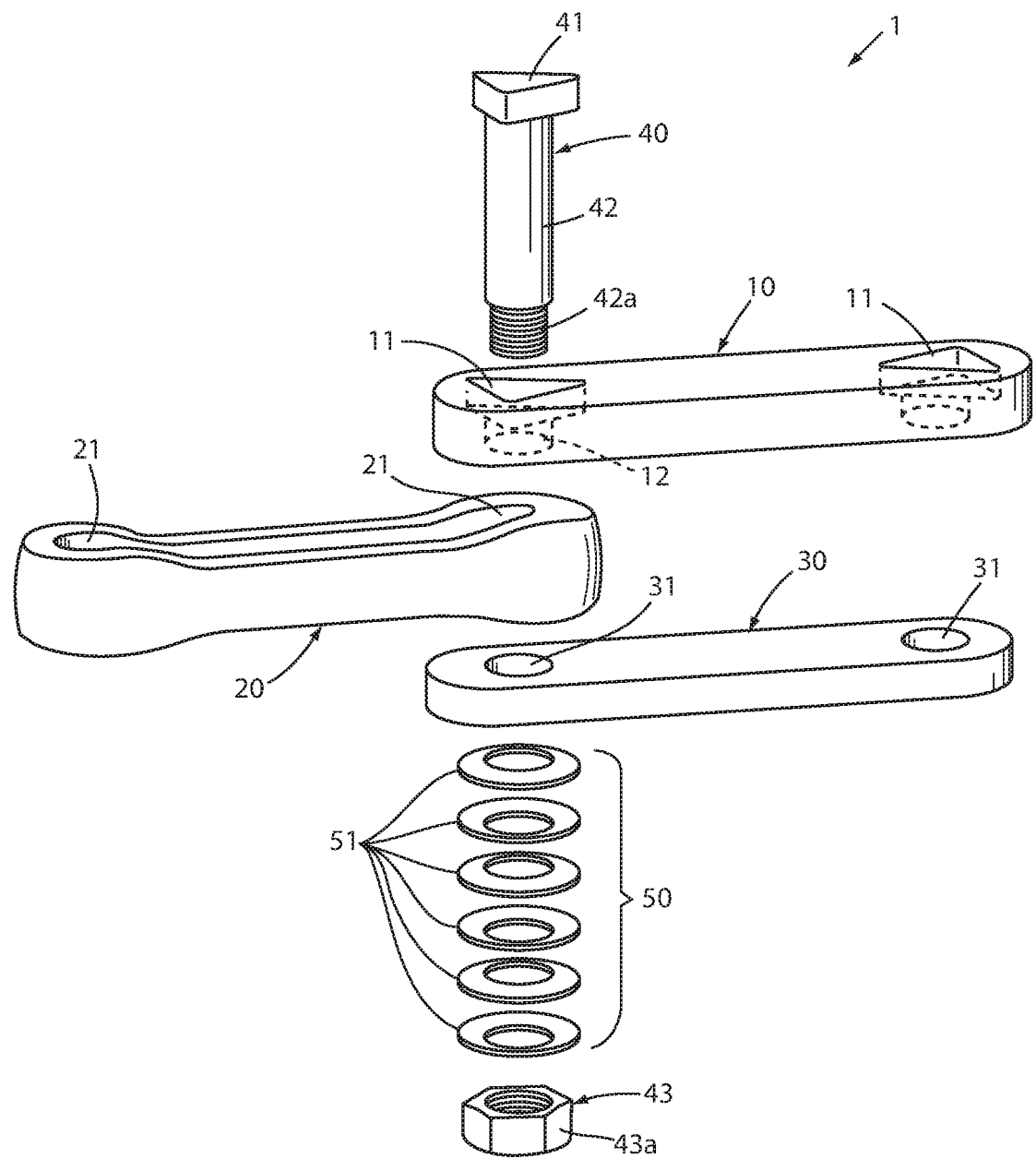
FIG. 1 is an exploded perspective view of a chain section showing a pin position control side link, an opposite neutral side link, a center link, a link pin and a biasing member.
Figure 5:
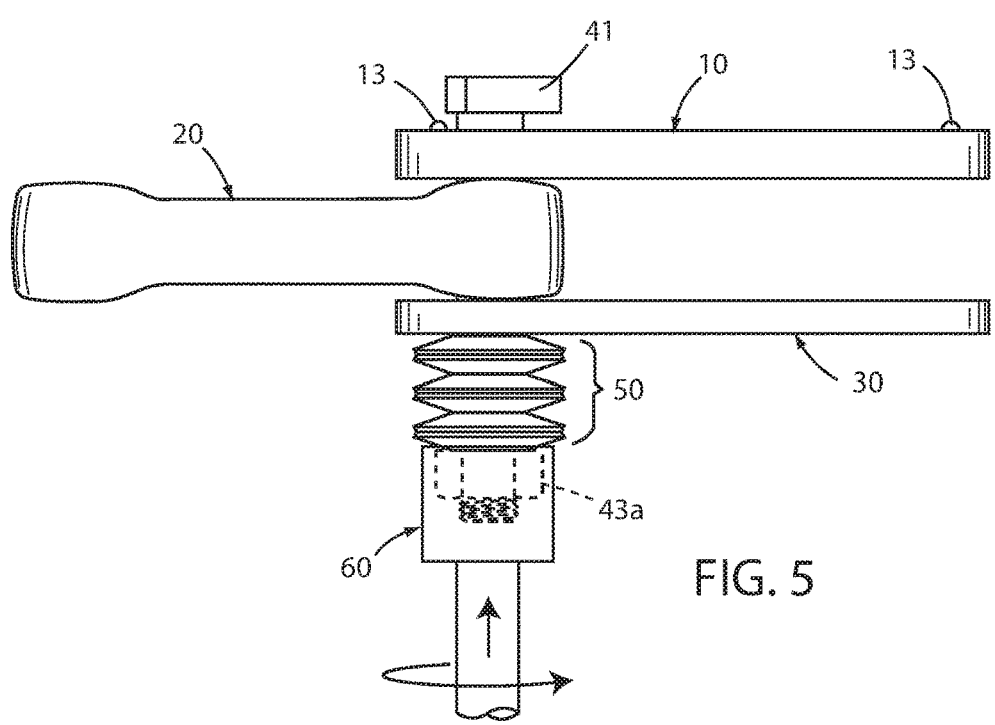
FIG. 5 is the side elevation view of FIG. 4, with a turning tool engaging the link pin to lift it out of engagement with the detent on the position control link.

In the various preferred embodiments, a conveyor chain segment 1 is shown with a position control side link 10, a chain center link 20, a neutral side link 30, a link pin 40 and a biasing member 50 (see e.g. FIG. 1). As shown in FIG. 1, link pin 40 includes a triangular shaped positioning head 41, which is biased by biasing member 50 into engagement with a triangular shaped pin head retaining detent well 11. This keeps link pin 40 from rotating about when the conveyor chain is in use, thus keeping one wear surface on link pin 40 engaged with center link 20 during use. The wear surface is changed by engaging the tool engaging head 43 of link pin 40 with a turning tool 60, forcing tool 60 upwardly to compress biasing member 50 and thereby lifting positioning head 41 of link pin 40 out of engagement with pin head retaining well detent 11 (FIG. 5). Tool 60 is then rotated to present 120° to present another wear face for engagement with center link 20. The pressure of tool 60 against biasing member 50 is then released, allowing member 50 to bias positioning head 41 in its new orientation back into engagement with detent 11.

In the FIG. 1 embodiment, the detent comprises a well 11 which has the same triangular configuration as the positioning head 41 of pin 40. Pin 40 is of the bolt type, having a shaft 42 and a threaded end 42a to which a nut 43a is threaded, once pin 41 is inserted through positioning link 10, center link 20 and neutral link 30. The tool engaging head 43 of pin 40 comprises threaded nut 43a. The biasing member 50 comprises a series of Bellville washers inverted relative to one another in the stack of 6 as shown in FIG. 1. The washers are fitted around shaft 42 and nut 43a is tightened on threads 42a.

Detent well 11 is formed in link 10 during the forging process. Extending from the bottom of detent well 11 is a hole 12 through which the shaft 42 of pin 40 extends. Similarly, holes 31 are formed in neutral link 30 such that the shafts 42 of pins 40 pass through neutral link 30 from one side to the other. Center link 20 is formed with an elongated opening extending through it, including end portions 21. The width of the opening in center link 20 is wide enough to receive the shaft 42 of link pin 40, and when the chain 1 is assembled, the shaft 42 of pin 40 engages the surface of the end opening portion 21 of center link 20.

Figure 2:
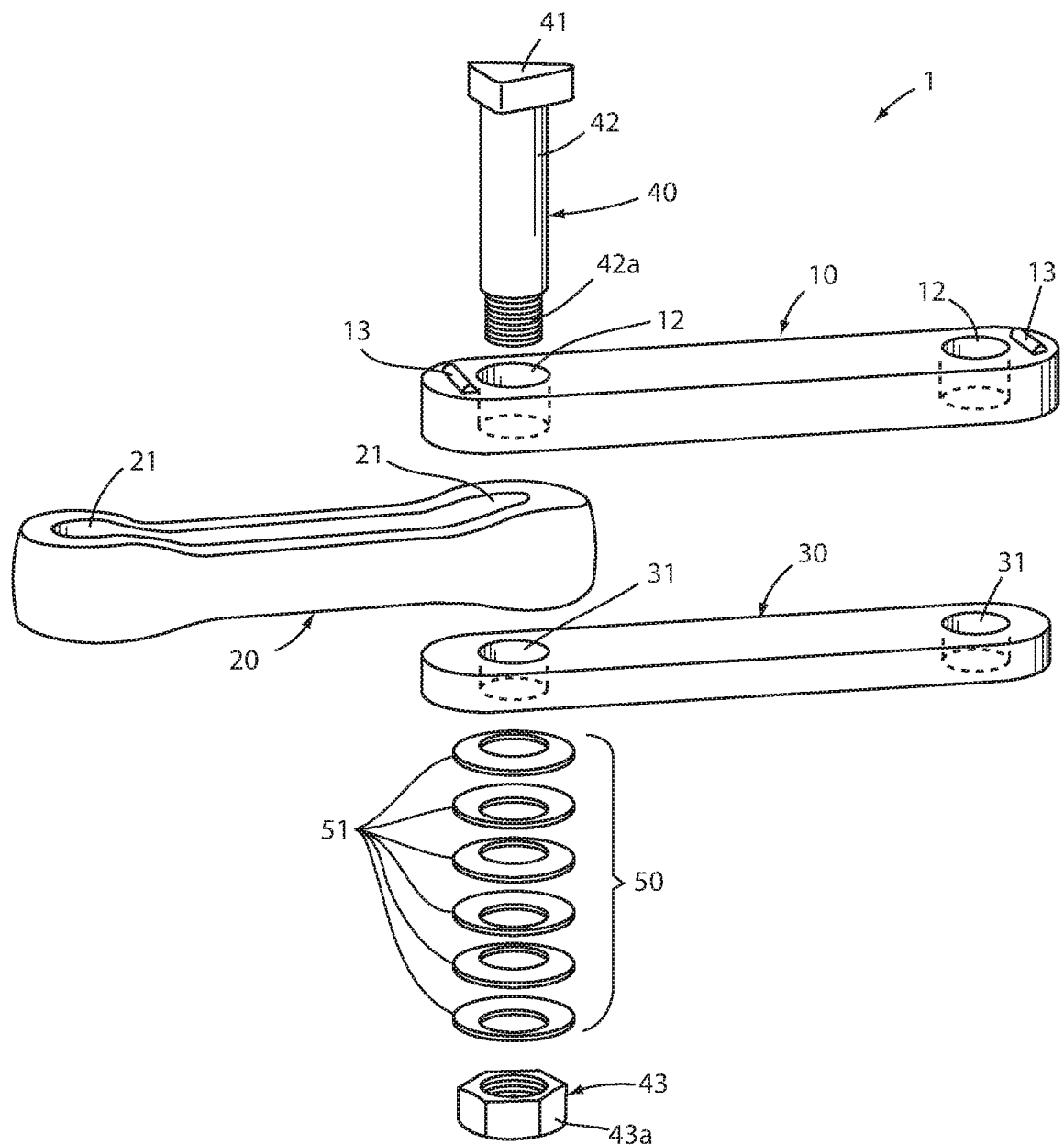
FIG. 2 is an exploded perspective view as in FIG. 1, but featuring a second embodiment position control side link.

In the FIG. 2 embodiment, detent well 11 is eliminated, and is replaced by a raised detent rib 13. Shaft hole 12 extends completely through positioning link 10 from one side to the other. Like detent well 11, detent rib 13 is formed during the forging process.

Detent rib 13 extends upwardly from about ⅛ to about ¼ inch. Preferably, detent rib 13 is spaced sufficiently close to the head of positioning link 10, and sufficiently far from the opening 12 through which pin 40 extends, that if a straight edge of triangular shaped positioning head 41 extended directly laterally between the sides of link 10, there would be a gap between that edge and detent rib 13. This allows some play in the positioning of head 41. In the FIG. 1 embodiment, head 41 must be positioned to precisely fit within triangular shape well 11. In the embodiment of FIGS. 2-5, head 41 has several degrees of rotation which it can extend through and still engage detent 13 to prevent further rotation. Thus, as shown in plan view in FIG. 3, positioning head 41 is cocked such that it engages detent 13 at a point near the apex of the triangle. This also can be seen in elevational view in FIG. 4.

To adjust link pin 40 to a new position, a turning tool 60 engages the hexagonal engaging head 43a and pushes it upwardly against the biasing force of Bellville washers 51, raising positioning head 41 above the level of detent 13. Link pin 40 is then rotated through 120° and turning tool 60 is withdrawn. Biasing member 50 thus expands and positioning head 41 settles back into a position comparable to that shown in FIG. 3, such that further rotation of pin 40 is prevented by an edge of positioning head 41 abutting detent rib 13.

Figure 3:
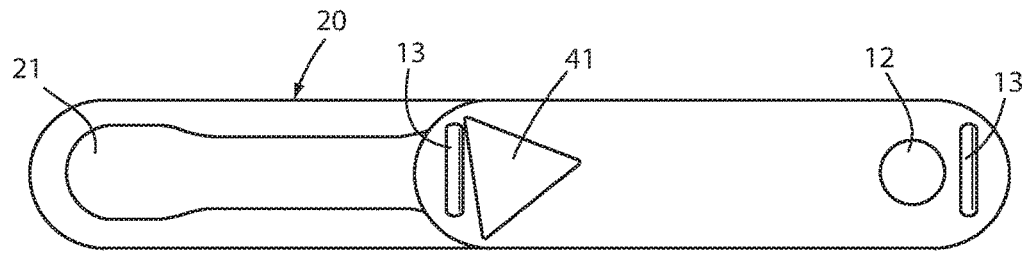
FIG. 3 is a top plan view of the chain section of FIG. 2.
Figure 4:
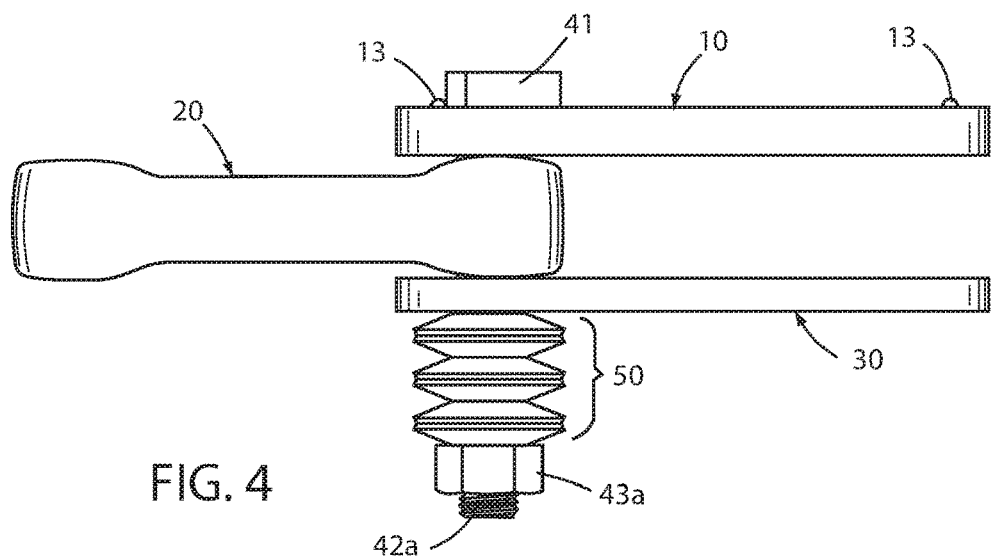
FIG. 4 is a side elevation of the assembled chain section of FIG. 2.
Figure 6:
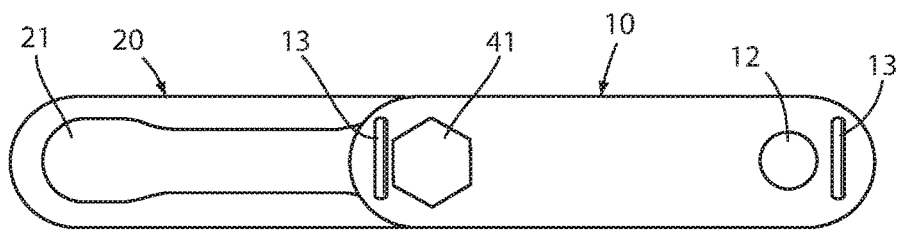
FIG. 6 is a top plan view of a chain link section as in FIG. 3, but with an alternative embodiment link pin having six wear positions rather than three as shown in FIG. 3.

FIG. 6 shows an alternative preferred embodiment which is comparable to that of FIGS. 3-5, except that positioning head 41 has a hexagonal configuration. Thus, link pin 40 can be rotated to six different wear surfaces for engaging center pin 20 at 21.

Figure 7:
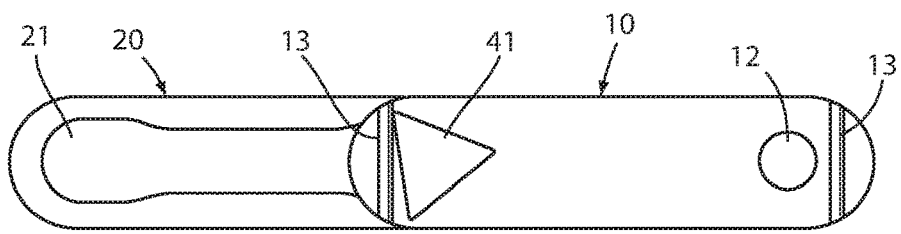
FIG. 7 is a top plan view of a chain link section as in FIG. 3, but with an alternative embodiment detent on the position control side link.

FIG. 7 shows yet another embodiment in which positioning head 41 is of a triangular configuration as shown in FIGS. 1 and 3, and detent rib 13 extends completely from side to side of positioning link 10.

Figure 8:
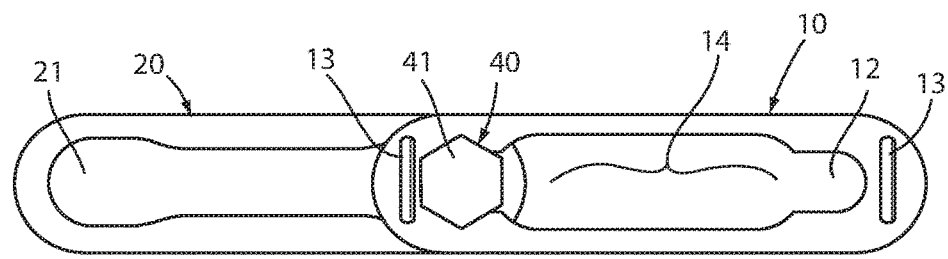
FIG. 8 is a top plan view of a chain link section as in FIG. 3, but with an alternative embodiment link pin, biasing member, and side links.
Figure 9:
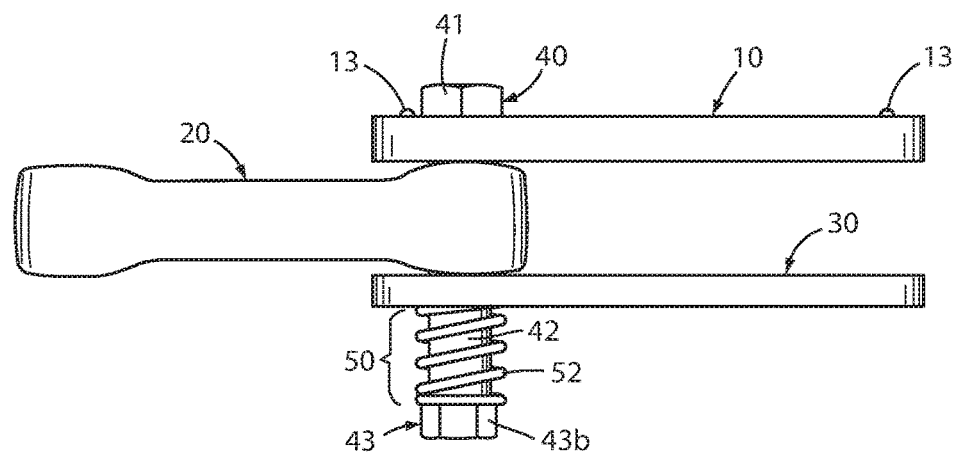
FIG. 9 is a side elevation of the chain link section of FIG. 8.

FIGS. 8 and 9 show an alternative embodiment in which link pin 40 comprises an I-pin, rather than a bolt type pin. In an I-pin, positioning head 41 and engaging head 43 are an integral part of the link pin shaft 42. Thus, neither head 41 or 43b can be removed from shaft 42. To accommodate I-pins, side links 10 and 30 include a wide central opening 14, which narrows down at each end to a narrower pin receiving opening 12. Central opening 14 is wide enough for pin heads 41 and 43b to pass through, while pin receiving openings 12 are just slightly wider than the diameter of pin shaft 42. Center link 20, on the other hand, has openings 21 at each end which are wide enough to allow pin head 41 and 43b to pass through. The openings of side links 10 and 30 are aligned with an opening 21 of center link 20, and an I-pin link pin 40 is passed through the three links. Side links 10 and 30 are then pulled such that the shaft of I-pin slides into the U-shaped opening 12 which receives the shaft 42 of link pin 40.

A different type of biasing member must be employed when an I-pin is used. In this case, a coil spring 52 is coiled around shaft 42 and allowed to seat between the face of neutral link 30 and the head 43b of I-pin 40.

Figure 10:
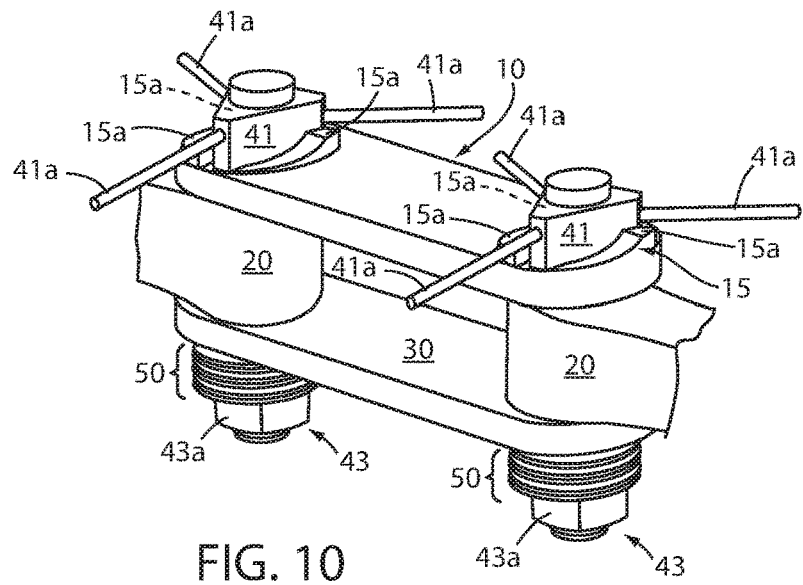
FIG. 10 is a perspective view of another alternative embodiment chain section, featuring ramped detents on the position control side link, and turn-style projections on the head of the link pin.
Figure 11:
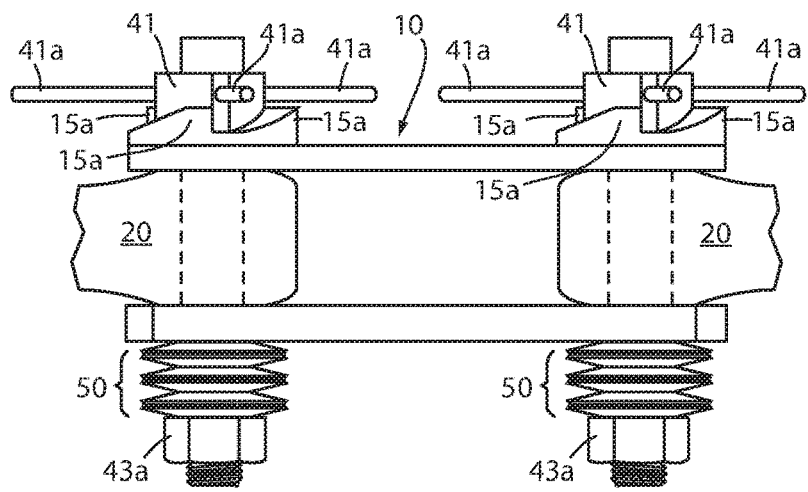
FIG. 11 is a side elevation of the chain section of FIG. 10.
Figure 12:
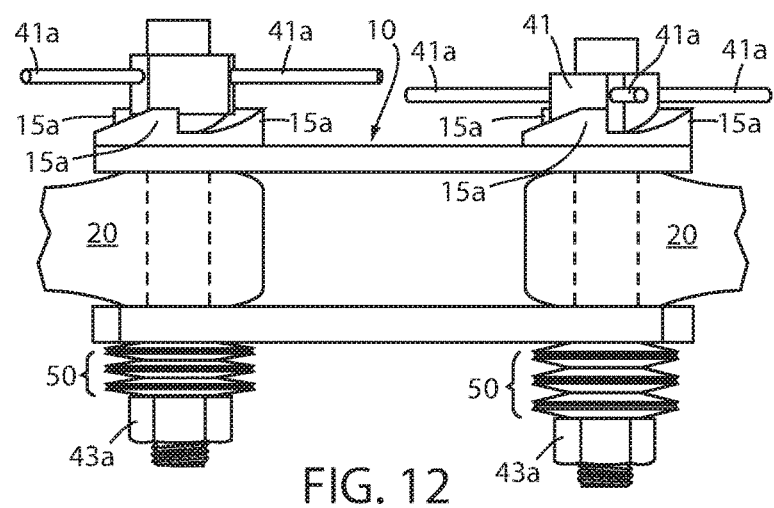
FIG. 12 is the side elevation view of FIG. 11.

In the embodiment shown in FIGS. 10-12, the detent comprises three ramps 15a in succession, surrounding the pin shaft opening 12. The link pin is biased by biasing member 50 such that the triangular positioning head 41 of the pin 40 tends to seat itself with each apex of the triangle just beyond the elevated end of one ramp 15a, and at the low end of the next adjacent ramp 15a. Thus, in the seated position, each apex of the triangular head 41 is positioned at the bottom of a ramp 15a just beyond the sharp drop into the seat at the end of the preceding ramp 15a.

Figure 14:
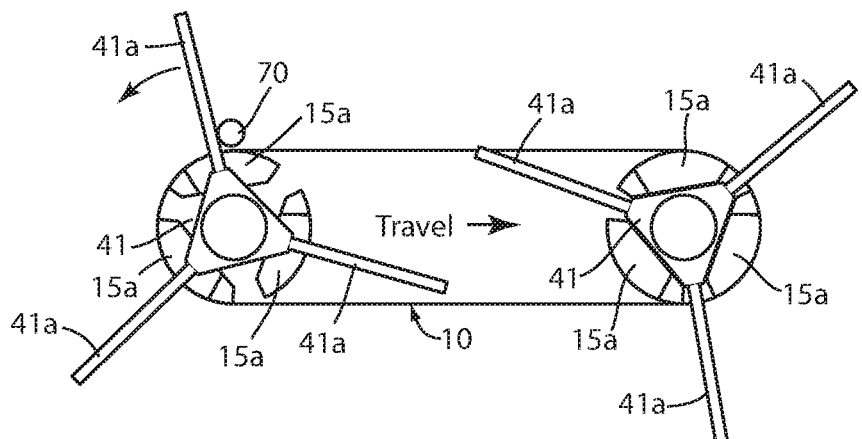
FIG. 14 shows the link pin of FIG. 13 having been partially rotated towards a new position by the action of turning tool 70 on a turn-style projection on the head of the link pin.
Figure 15:
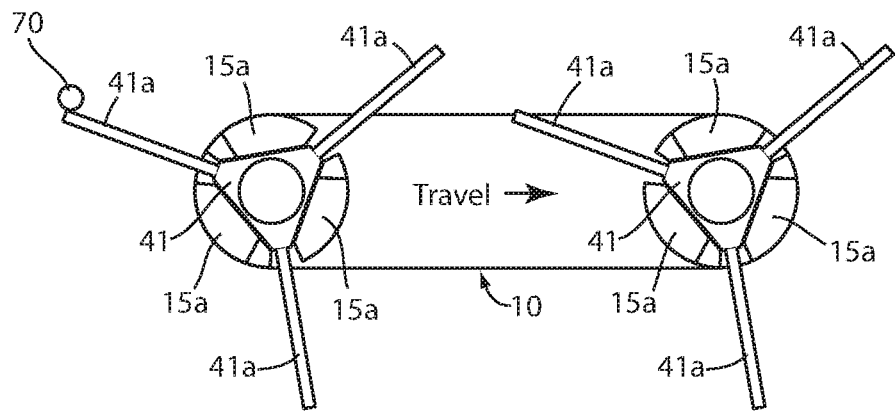
FIG. 15 shows the link pin of FIG. 13 having been fully rotated into a new position by the action of turning tool 70 on the turn-style projection on the head of the link pin.

The head of the pin includes three "turn style" projections or arms 41a, each of which as shown extends radially outwardly from an apex or "corner" of the triangular shaped head 41, although it is not necessary the turn-style projections extend precisely radially, so long as they extend outwardly in turns-style fashion from each said corner. When a wear monitor detects sufficient wear on a surface of the link pin, a turning tool 70 is projected into the path of a turn-style projection 41a of the link pin head 41. Turning tool 70 is a stop which is engaged by a turn-style projection 41a when it passes. As the head 41 of the pin 40 passes, turning tool 70 engages the lead one of said turn-style projections 41a, causing pin 40 to rotate up and over the ramp surface 15a, such that pin 41 is rotated out of the position it was in (FIGS. 13 and 14), and into a new position 120° from the first (FIG. 15). Pin 40 may be slightly over-rotated as turning tool 70 slides over the end of turn-style projection 41a, but will tend to slide back down to the bottom of ramp 15a through vibration and the biasing action of bias 50 on pin 41.

Figure 13:
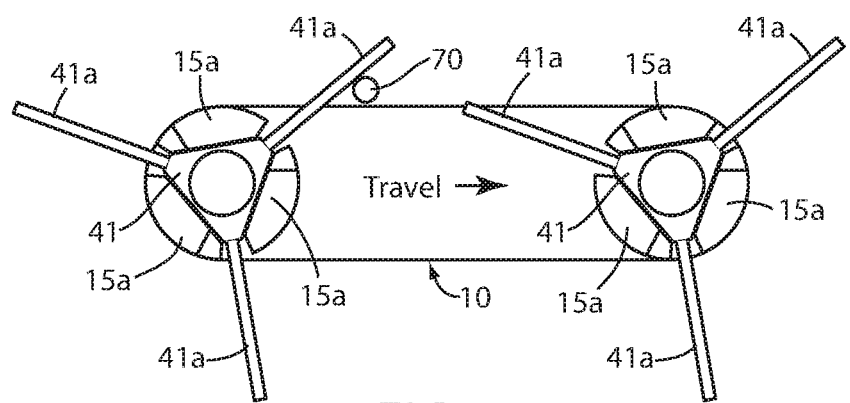
FIG. 13 shows a turning tool inserted into the path of a turn-style projection as the chain passes.

The ramps 15a and turn-style projections 41a are arranged such that one projection extends into the path of turning tool 70 as the chain proceeds toward it (FIG. 13). When the turning tool 70 is activated into position in the path of the turn-style projection 41a, it engages the projection and turns the pin as the pin head passes (FIG. 14), thus rotating the pin to a new operating position (FIG. 15). The turning tool then slides past the turn-style projection it had engaged, and a new turn-style projection has been rotated into the path of the turning tool the next time a change in position is required, and the turning tool is again activated to its location adjacent the passing chain (FIGS. 13-15).

As shown, pin 70 has three operating positions, and three turn-style projections 41a. The ramps are positioned such that one of the projections 41a extends into the path of turning tool 70, when turning tool 70 is activated into position adjacent the passing chain. As shown in FIG. 13, turn-style projection 41a projects toward the oncoming turning tool 70 at an angle of about 30° to the line of travel of the chain past the turning tool 70. The engaged link pin projection 41a is rotated from its initial position pointing towards turning tool 70, through about 120°, to a position pointing away from the path of turning tool 70, thus allowing turning tool 70 to slide over the end of turn-style projection 41a, after head 41 of link pin 40 is seated in its new position, with a new wear surface facing the inside of the pin receiving portion 21 of center link 20. Thus, the FIGS. 10-15 embodiment provides an arrangement in which the link pins can be automatically rotated to their new wear surface positions, by projecting a turning tool into the path of the turn-style projections 41a as the chain passes by.

Any of the above embodiments may be operated automatically by operably connecting the turning tool to a wear monitor which is operably connected to the conveyor chain for monitoring wear. When an undesirable degree of chain wear is detected, the turning tool would be activated to engage the chain and effect rotation of one or more adjustable link pins to their new wear position. Such monitors typically monitor and provide a read out of average chain wear, and hence would activate the turning tool to rotate all the link pins to a new position as part of a single operation. For example, turning tool (stop) 70 would be positioned in the path of the passing turn-style projections until all the link pins had been rotated to new positions.

Preferably, our wear monitor as disclosed in United States Patent Publication No. 2016/0010977 would be used. It is capable of monitoring wear on each individual chain link, as well as on the entire chain. Thus, a tool 70 could be activated to adjust only one or a few chain link pins in a single operation, or could be activated to engage and rotate all the link pins in a single operation.

Of course, it is understood that the above are preferred embodiments of the invention, and that various changes and alterations can be made without departing from the spirit of the invention as summarized above.

The invention claimed is:

1. A conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link, each said operating position presenting a respective wear surface on said pin, which is engaged by said center link through which it passes, and is worn by the relative movement between said pin and said associated center link, in which: each said pin includes a biasing member which biases said positioning head of said pin downwardly into one of said operating positions with its said positioning head blocked against rotation by engagement said detent; said biasing member having a range of operation upwardly which permits said pin to be lifted up so that its head is above the level of said detent, allowing said pin to be rotated to a new operating position, and biased back into its new operating position with said positioning head again blocked against rotation by said detent; said detent comprising a raised detent rib on said positioning side link, said positioning head having a side corresponding to each of said multiple wear surfaces on said pin, each said side extending laterally a sufficient distance and being sufficiently close to said rib when said pin is located in one of its said operating positions, that said rib blocks rotation of said pin relative to its said positioning side link because of engagement by said positioning head side;

said detent rib extending upwardly from about ⅛ to about ¼ inch above the surface of said positioning side link which is engaged by said positioning head when said pin is in one of its said operating positions.

2. The conveyor chain of claim 1 in which: each said detent rib is spaced sufficiently close to the end of positioning link, and sufficiently far from said opening in said positioning side link through which said pin extends, that if a side of said positioning head extended directly laterally between the sides of said positioning link, there would be a gap between said side and said detent rib, allowing some play in the positioning of said positioning head.

3. A conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link, each said operating position presenting a respective wear surface on said pin, which is engaged by said center link through which it passes, and is worn by the relative movement between said pin and said associated center link, in which: each said pin includes a biasing member which biases said positioning head of said pin downwardly into one of said operating positions with its said positioning head blocked against rotation by engagement with said detent; said biasing member having a range of operation upwardly which permits said pin to be lifted up so that its head is above the level of said detent, allowing said pin to be rotated to a new operating position, and biased back into its new operating position with said positioning head again blocked against rotation by said detent; said detent comprising a raised detent rib on said positioning side link, said positioning head having a side corresponding to each of said multiple wear surfaces on said pin, each said side extending laterally a sufficient distance and being sufficiently close to said rib when said pin is located in one of its said operating positions, that said rib blocks rotation of said pin relative to its said positioning side link because of engagement by said positioning head side; each said detent rib being spaced sufficiently close to the end of said positioning side link, and sufficiently far from said opening in said positioning side link through which said pin extends, that if a side of said positioning head extended directly laterally between the sides of said positioning link, there would be a gap between said side and said detent rib, allowing some play in the positioning of said positioning head.

4. The conveyor chain of claim 3 in which: said pin includes a bias member engaging head positioned on said link pin at the end opposite said positioning head; said biasing member comprises a plurality of Belleville washers positioned on said link pin extending from against said bias member engaging head into operable engagement with said center link, whereby a lifting force applied against said pin at said bias member end thereof compresses said bias member and lifts said position engaging head above the level of said detent on said positioning side link.

5. The conveyor chain of claim 3 in which: said pin includes a bias member engaging head positioned on said link pin at the end opposite said positioning head; said biasing member comprises spring coiled around said link pin and extending from against said bias member engaging head into operable engagement with said center link, whereby a lifting force applied against said pin at said bias member end thereof compresses said bias member and lifts said position engaging head above the level of said detent on said positioning side link.

6. A conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link, each said operating position presenting a respective wear surface on said pin, which is engaged by said center link through which it passes, and is worn by the relative movement between said pin and said associated center link, in which: each said pin includes a biasing member which biases said positioning head of said pin downwardly into one of said operating positions with its said positioning head blocked against rotation by engagement with said detent; said biasing member having a range of operation upwardly which permits said pin to be lifted up so that its head is above the level of said detent, allowing said pin to be rotated to a new operating position, and biased back into its new operating position with said positioning head again blocked against rotation by said detent; said pin including a biasing member engaging head positioned on said link pin at the end opposite said positioning head; said biasing member comprises a plurality of Belleville washers positioned on said link pin extending from against said bias member engaging head into operable engagement with said center link, whereby a lifting force applied against said pin at said bias member end thereof compresses said bias member and lifts said position engaging head above the level of said detent on said positioning side link.

7. A conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link, each said operating position presenting a respective wear surface on said pin, which is engaged by said center link through which it passes, and is worn by the relative movement between said pin and said associated center link, in which: each said pin includes a biasing member which biases said positioning head of said pin downwardly into one of said operating positions with its said positioning head blocked against rotation by engagement with said detent; said biasing member having a range of operation upwardly which permits said pin to be lifted up so that its head is above the level of said detent, allowing said pin to be rotated to a new operating position, and biased back into its new operating position with said positioning head again blocked against rotation by said detent, said detent comprising multiple ramps arranged in succession, surrounding said link pin opening in said positioning link; said ramps corresponding in number to the number of said wear surfaces on said pin, and said positioning head having a side corresponding to each said wear surface, there being a corner between each of said sides; said biasing member biasing said positioning head such that each said corner tends to seat itself with each said corner located just beyond the elevated end of one of said ramps, and at the low end of the next adjacent one of said ramps.

8. The conveyor chain of claim 7 in which: said positioning head includes turn style projections, one of which extends outwardly from each said corner of said positioning head; said ramps being positioned such that one of said turn style projections extends laterally away from the side of said chain as it travels on said support; whereby each said link pin can be rotated from one position on one of said ramps, up said ramp and down into a seated position on the next adjacent one of said ramps, by positioning a turning tool in the path of said turn style projections as said chain is moved past said turning tool.

9. The conveyor chain of claim 8 in which: said ramps and said turn-style projections are arranged such that one such projection extends into the path of said turning tool as said chain proceeds toward it.

10. The conveyor chain of claim 9 in which said pin has three of said operating positions, three of said wear faces, and three of said turn style projections; said ramps being positioned such that one of said turn style projections projects into the path of turning tool at an angle of about 30° to the line of travel of conveyor chain past said turning tool; said turn style projection being rotated by engagement with said turning tool, through about 120°, thus allowing turning tool 70 to slide over the end of said turn style projection, after said positioning head of said link pin is seated in its new position.

11. A conveyor chain and chain support combination comprising: said conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link, each said operating position presenting a respective wear surface on said pin, which is engaged by said center link through which it passes, and is worn by the relative movement between said pin and said associated center link, in which: each said pin includes a biasing member which biases said positioning head of said pin into one of said operating positions with its said positioning head blocked against rotation by engagement with said detent; said biasing member having a range of operation which permits said pin to be lifted up so that its head is above the level of said detent, allowing said pin to be rotated to a new operating position, and biased back into its new operating position with said positioning head again blocked against rotation by said detent; said detent comprising multiple ramps arranged in succession, surrounding said link pin opening in said positioning link; said ramps corresponding in number to the number of said wear surfaces on said pin, and said positioning head having a side corresponding to each said wear surface, there being a corner between each of said sides; said biasing member biasing said positioning head such that each said corner tends to seat itself with each said corner located just beyond the elevated end of one of said ramps, and at the low end of the next adjacent one of said ramps; said positioning head including turn-style projections, one of which extends out from each corner of said positioning head, said ramps being positioned such that one of said turn-style projections extends laterally away from the side of said chain as it travels on said support; said chain support including a turning tool moveably mounted on said support between a turning position adjacent the path of travel of said chain as it moves on said support, and in line with said each said laterally projecting turn style projection as said chain moves, and an at rest position which is not in the path of travel of said laterally projecting turn style projections as said chain moves, whereby each said link pin can be rotated from one position on one of said ramps, up said ramp and down into a seated position on the next adjacent one of said ramps, by positioning said turning tool in the path of said turn style projections as said chain is moved past said turning tool.

12. The conveyor chain and chain support combination of claim 11, which also includes: a chain wear monitor operably connect to said chain for monitoring wear on said link pins, and operably connected to said turning tool, whereby said turning tool is positioned in its turning position when a particular degree of link pin wear is detected by said chain wear monitor.

13. The conveyor chain of claim 12 in which said pin has three of said operating positions, three of said wear faces, and three of said turn style projections; said ramps being positioned such that one of said turn style projections projects into the path of turning tool at an angle of about 30° to the line of travel of conveyor chain past said turning tool; said turn style projection being rotated by engagement with said turning tool, through about 120°, thus allowing turning tool 70 to slide over the end of said turn style projection, after said positioning head of said link pin is seated in its new position.

14. A conveyor chain, chain wear monitor and turning tool combination comprising: said conveyor chain having a plurality of center links having spaced ends, said center links being joined by link pins at each end to adjacent positioning side links, each said link pin extending through openings in said center link and said positioning side link, and having a positioning head on at least one end of said link pin, each said link pin being adjustable in turn to one of multiple operating positions in which said positioning head is blocked against further rotation relative to its positioning side link by a detent on its said positioning side link; each said operating position presenting a respective wear surface on said pin, which is engaged by said center link through which it passes, and is worn by the relative movement between said pin and said associated center link, in which: each said pin includes a biasing member which biases said positioning head of said pin downwardly into one of said operating positions with its said positioning head blocked against rotation by engagement with said detent; said biasing member having a range of operation upwardly which permits said pin to be lifted up so that its head is above the level of said detent, allowing said pin to be rotated to a new operating position, and biased back into its new operating position with said positioning head again blocked against rotation by said detent; a turning tool operably connected to said conveyor chain for engaging a link pin and rotating it to a new operating position; and a wear monitor operably connected to said conveyor chain for monitoring chain wear; and operably connected to said turning tool for activating said turning tool into engagement with a link pin and turning it to a new position, in response to the chain wear monitor detecting an undesirable degree of wear in said chain.

15. The conveyor chain, chain wear monitor and turning tool combination of claim 14 in which: said detent comprises a receiving well in said positioning side link having the same configuration as said positioning head on said pin.

16. The conveyor chain, chain wear monitor and turning tool combination of claim 14 in which: said detent comprises a raised detent rib on said positioning side link, said positioning head having a side corresponding to each of said multiple wear surfaces on said pin, each said side extending laterally a sufficient distance and being sufficiently close to said rib when said pin is located in one of its said operating positions, that said rib blocks rotation of said pin relative to its said positioning side link because of engagement by said positioning head side.

17. The conveyor chain, chain wear monitor and turning tool combination of claim 14 in which: said pin includes a bias member engaging head positioned on said link pin at the end opposite said positioning head; said biasing member comprises spring coiled around said link pin and extending from against said bias member engaging head into operable engagement with said center link, whereby a lifting force applied against said pin at said bias member end thereof compresses said bias member and lifts said position engaging head above the level of said detent on said positioning side link.

* * * * *